United States Patent
Lundstrom

[15] 3,704,412
[45] Nov. 28, 1972

[54] SCANNING IMPEDANCE MEASURING SYSTEM EMPLOYING A SPIRAL SENSING ELEMENT

[72] Inventor: John W. Lundstrom, Glendora, Calif.

[73] Assignee: Moisture Register Company, Alhambra, Calif.

[22] Filed: Feb. 11, 1971

[21] Appl. No.: 114,659

[52] U.S. Cl. .............................................. 324/61 R
[51] Int. Cl. ........................................... G01r 27/26
[58] Field of Search .............. 324/61; 317/246; 73/73

[56] References Cited

UNITED STATES PATENTS

| | | |
|---|---|---|
| 2,806,204 | 9/1957 | Rothacker ................... 324/61 |
| 2,659,048 | 11/1953 | Zabel et al. .................. 324/65 |
| 2,782,367 | 2/1957 | Dallas .......................... 324/61 |
| 2,718,620 | 9/1955 | Howe .......................... 324/61 |

FOREIGN PATENTS OR APPLICATIONS

38/19050   9/1963   Japan ......................... 324/61

Primary Examiner—Stanley T. Krawczewicz
Attorney—Forrest J. Lilly

[57] ABSTRACT

Apparatus for periodically scanning the impedance across a web of material and displaying the impedance variations. A sensing element having a pair of parallel, spaced metallic strips spirally mounted on the external surface of a carrier cylinder is positioned across the web for minimal surface contact therewith. A small section of the width of the web is in surface contact with the spaced parallel strips and forms an impedance therebetween to be measured. The section of the web being measured moves, in affect, across the web as the cylinder rotates. The measuring circuitry includes a periodically balanced impedance bridge circuit and a triggering mechanism for the measuring and display systems which generates simultaneous isolated trigger pulses.

10 Claims, 3 Drawing Figures

INVENTOR.
JOHN W. LUNDSTROM
BY
Forrest J. Lilly
ATTORNEY

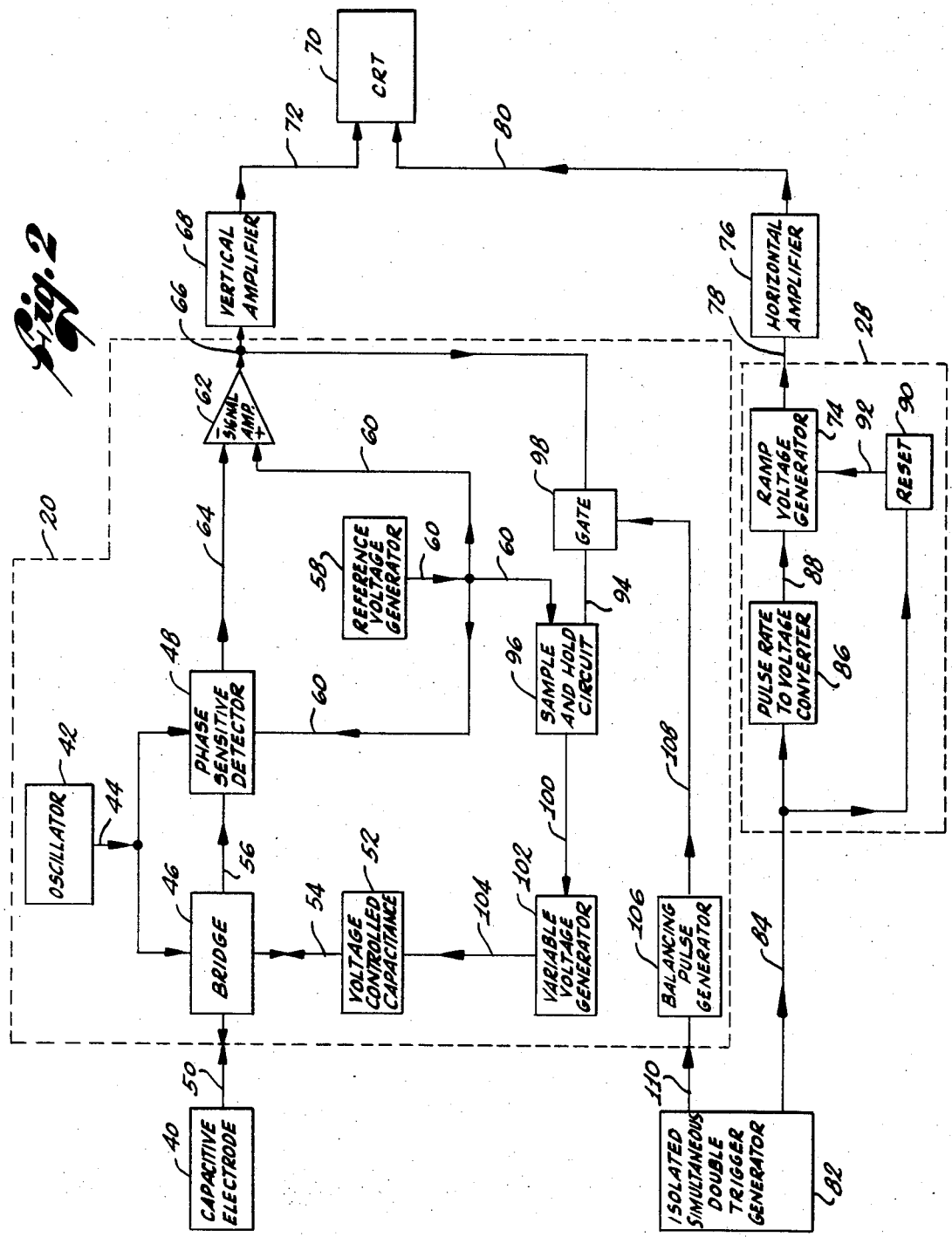

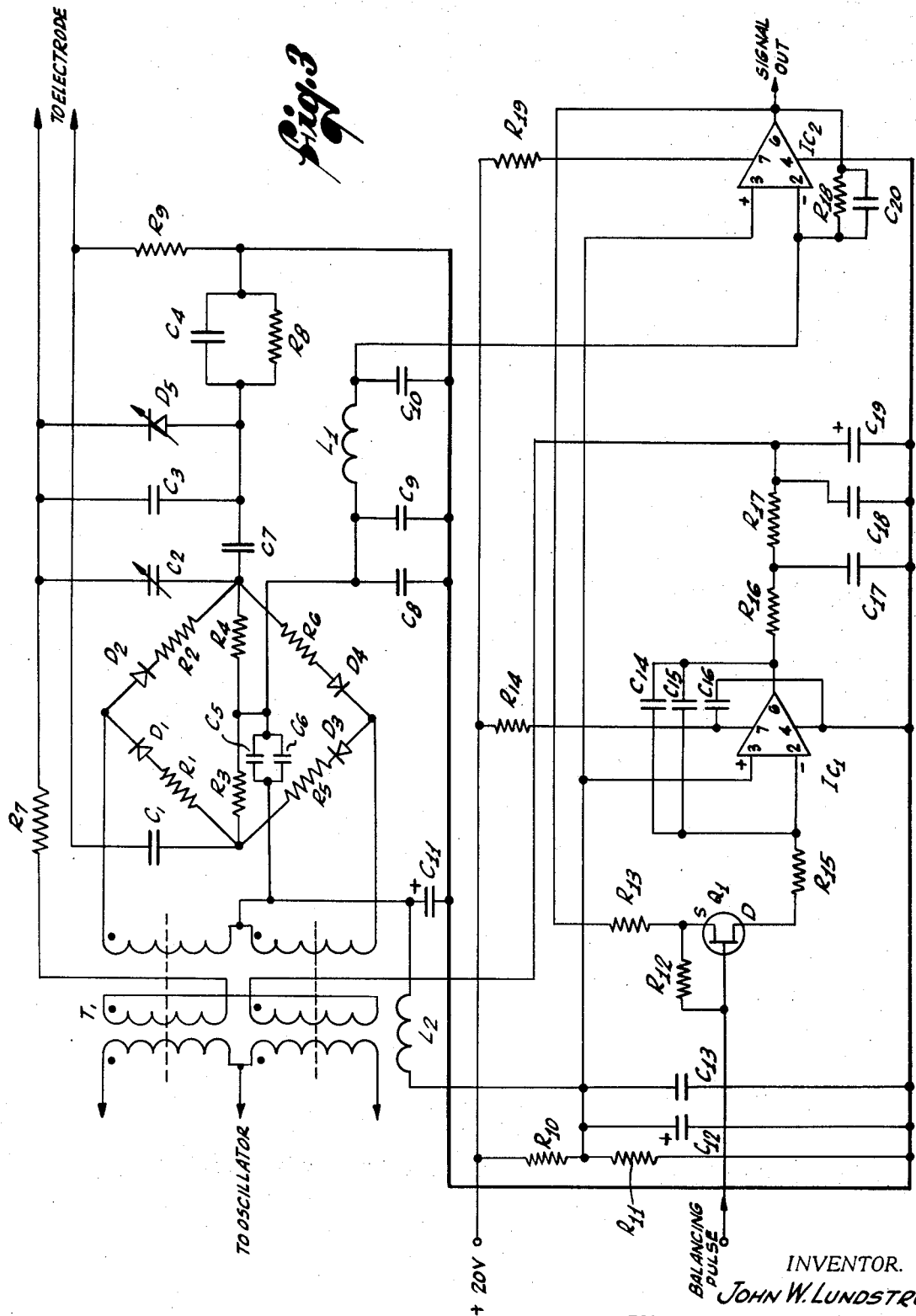

SCANNING IMPEDANCE MEASURING SYSTEM EMPLOYING A SPIRAL SENSING ELEMENT

BACKGROUND OF THE INVENTION

The present invention relates generally to measuring instruments and more particularly to a system for substantially continuously monitoring and displaying the impedance across a web of material.

DESCRIPTION OF THE PRIOR ART

In paper making and related fields, it is often desirable at some point in a manufacturing process to measure the moisture content or another parameter across a web of material. While manual spot checks are possible, automatic systems have been developed for scanning the width of the web while measuring the desired parameter and simultaneously displaying the parameter on some suitable device such as a cathode ray tube. A well-known method of measuring moisture content indirectly is to measure the resistance or impedance of the web between relatively closely spaced points on the web. The typical apparatus for accomplishing the impedance measurement was a pair of electrical conductors between which the web passed.

Because the electrical characteristics of such an apparatus is dependent on its physical arrangement, such prior art systems generally required considerable initial adjustment and were subject to deviations in the readings of the desired parameter due to changes in the width or thickness of the web material passing between the conductors. Such systems therefore normally included relatively complex physical mechanisms for adjusting the relative position of the conductors in respect to each other and for compensating for variations of the thickness of the webbing material. In addition, since practical systems of this type normally utilize alternating voltages in the radio frequency range as the measuring signal, isolation of the radio frequencies and synchronization of the sweep circuits for a cathode ray tube problems required relatively complex adjusting and compensating circuitry.

SUMMARY OF THE INVENTION

The measuring system of the present invention provides a means for scanning the impedance across a web of material utilizing a single sensing element spirally mounted on a carrier cylinder so that a small portion of the element is in contact with the web and, the contact point moves, in effect across the web as the cylinder rotates. The sensing element has a pair of parallel, spaced metallic strips spirally mounted around the external surface of the cylinder and the cylinder is positioned with respect to the web for minimal surface contact therewith. Thus, only one physical component, a carrier cylinder, is needed to scan the width of the web and measure the desired parameter and no physical adjustment of the sensing element is necessary. This results in a measuring system which is very simple to install and which needs practically no adjustment after installation. Variations in the thickness of a web being scanned have no effect on the physical components of the system. Such variations may be compensated for by manual or automatic adjustments in electronic circuitry associated with the single physical component.

The scanning and displaying system of the present invention further includes a periodically balanced measuring bridge circuit which provides an accurate and highly stable signal for display, preferably on a cathode ray tube.

Variations in the rotational speed of the cylinder are automatically compensated for in the display sections of the system so that the display signal accurately represents the position across the web of the measured parameter regardless of variations in the speed of the moving web.

In addition, a unique triggering means is employed in the particular presently preferred embodiment of the invention to supply trigger pulses simultaneously to the rotating and fixed members of the system. As the high frequency signals employed are completely contained within the shielded carrier cylinder, simultaneous trigger pulses are generated by magnetic pick-ups passing each other once per revolution of the cylinder without an actual physical connection between the necessary pick-ups. Therefore, the trigger pulses are completely isolated from each other eliminating the necessity of a moving electrical connection between the rotating cylinder and the fixed portions of the measuring system.

Thus, the impedance measuring system of the present invention provides a single physical component for measuring a desired parameter and that physical component requires no adjustment other than proper positioning with respect to the web. Also, variations in the manufacturing process which result in variation of the speed of the moving web are automatically compensated for by the scanning and display system of the invention.

BRIEF DESCRIPTION OF THE DRAWINGS

FIG. 2 is a block diagram of the system; and

FIG. 3 is an electrical schematic diagram of the measuring bridge and balancing circuits of the presently preferred embodiment of the present invention.

DESCRIPTION OF THE PREFERRED EMBODIMENTS

Figure 1:
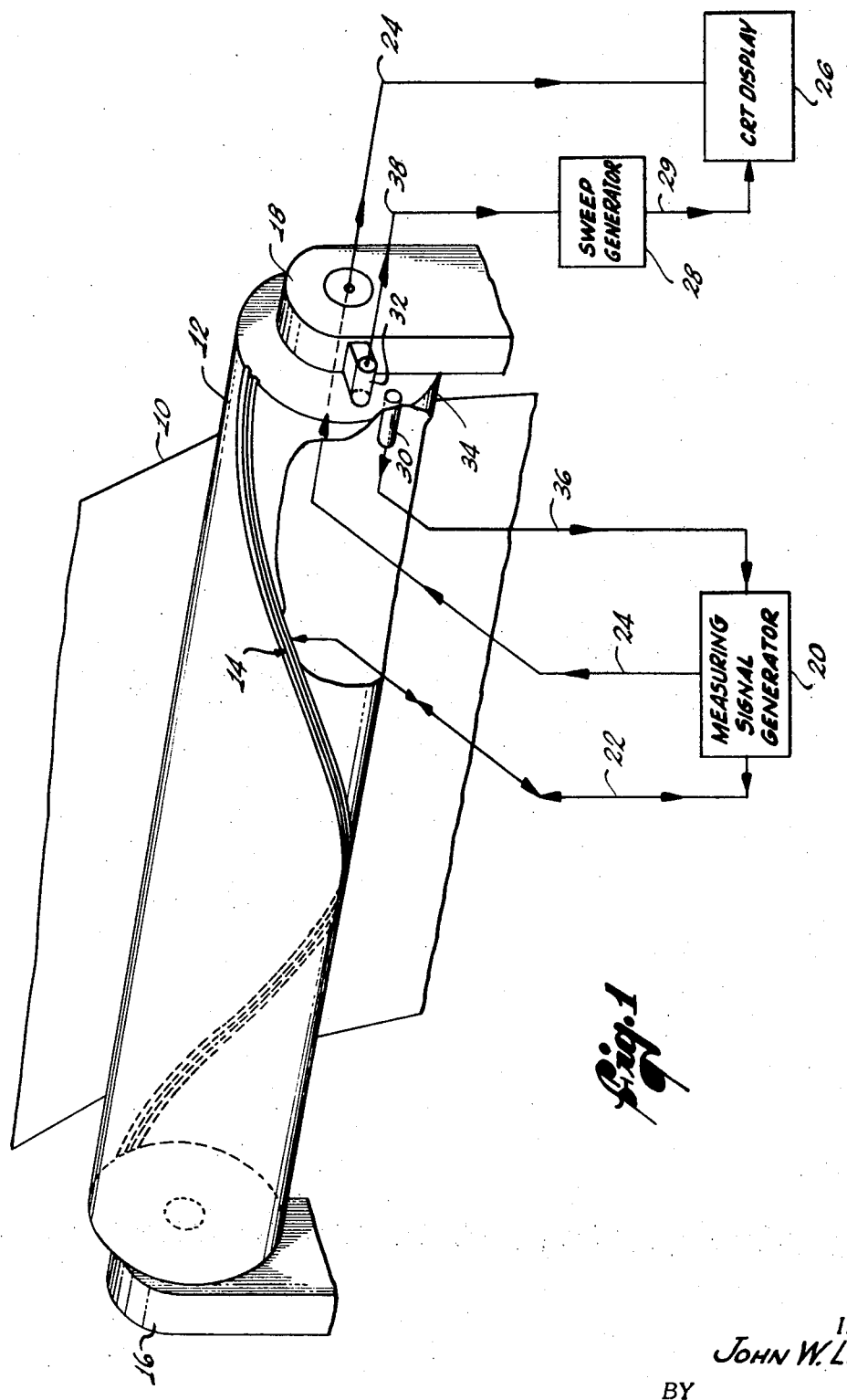
FIG. 1 is a diagrammatic representation of the impedance measuring and display system of the present invention.

Turning now to the drawings, FIG. 1 shows the basic plan of the impedance monitoring and display system of the present invention. The intended application of a presently preferred embodiment is measuring and displaying the moisture condition across a web 10 of a material such as paper during the manufacturing process. In this particular application, it is desired to generate a visual display of the moisture content across the web of paper on a relatively continuous basis so that abnormal conditions can be detected quickly and corrected.

It is well-known that the impedance of paper to radio frequency energy varies with the paper's moisture content. The system of the present invention utilizes this principle to measure the moisture content of the paper web indirectly by measuring its impedance to a radio frequency voltage. This is accomplished by passing the web 10 over a cylinder 12 carrying a sensing element in the form of a pair of parallel spaced metallic strips 14 which are spirally mounted around the external surface of the cylinder. The axis of the cylinder 12 is positioned across the web 10 and mounted for rotation about its axis on supports 16 and 18. The cylinder 12 is positioned so that web 10 has minimal contact with the external surface of the cylinder. Preferably, the surface contact of the web 10 alone causes the cylinder 12 to rotate with a circumferential speed equal to the speed of the web. However, in some cases an external rotational force may have to be applied to the cylinder 12 to maintain its circumferential speed equal to the speed of the moving web 10.

Due to the spiral configuration of the metallic strips 14 and the minimal surface contact of the web 10 with the cylinder 12, only a relatively short section of strips 14 are in contact with the web 10 at any given instant of time and that section moves, in effect, across the web as the cylinder rotates. A measuring signal generator 20 applies a radio frequency signal through the line 22 across the metallic strips 14 and measures the impedance to that energy of the section of the web 10 across the strips at any given moment. The generated impedance signal is preferably a d.c. voltage and is then carried by a line 24 through a suitable rotating contact (not shown) in the axis of the cylinder 12 to a cathode ray tube display unit 26. The impedance signal preferably serves as the vertical signal to the display unit 26 and a sweep generator 28 provides a horizontal signal through a line 29 for the display unit which is indicative of the position across the web 10 of the section of the metallic strips 14 in contact with the web.

A reference position of the cylinder 12 is signaled to both the measuring signal generator 20 and the sweep generator 28 by means of a pair of triggering units 30 and 32 mounted inside and end 34 of the cylinder 12 and the support 18, respectively. As the cylinder 12 rotates, the triggering units 30 and 32 develop simultaneous trigger pulses as they pass each other. The pulse generated by the triggering unit 30 is fed through a line 36 to the measuring signal generator 20 to periodically balance the generator, as will be described in detail below. The pulse generated by triggering unit 32 is fed through a line 38 to the sweep generator 28 and serves to synchronize the output of the generator with the position of the cylinder 12 and its rotational speed. The triggering units 30 and 32 are, for example, a magnetic pick-up of the type commonly employed to measure the rotational speed of gears.

The cylinder 12 is preferably hollow and constructed of an electrical insulating material, preferably a glass fiber reinforced polyester resin. In order to confine the radio frequency energy used to the immediate vicinity of the metallic strips 14, the inner surface of the cylinder 12 is preferably made electrically conductive by coating the inner surface with a metallic substance or using an equivalent construction. A relatively small opening in the conductive inner surface of the cylinder 12 allows connection of the metallic strips 14 to the measuring signal generator 20.

In order to maintain a smooth external surface for the cylinder 12, the metallic strips 14 are preferably embedded in the insulating material of the cylinder but spaced from the electrically conductive inner surface of the cylinder. For the purpose of measuring the moisture content of a paper web, it has been found that metallic strips approximately one-eighth of an inch wide and spaced approximately one-eighth of an inch apart are sufficient when used with a radio frequency of approximately 1 megahertz.

In the preferred embodiment of the measuring system of the invention, the measuring signal generator 20 is balanced for each revolution of the cylinder. The reference impedance for balancing is preferably free air which is provided by mounting the metallic strips 14 around less than the total circumference of the cylinder. The web 10 will then not contact the metallic strips 14 for a portion of a revolution of the cylinder 12. The circumferential distance required for balancing the measuring signal generator 20 principally depends on the number of degrees of wrap of the web 10 around the cylinder 12 required to rotate the cylinder. In a preferred embodiment of the measuring system of the invention, approximately one-fifth of the circumference of the cylinder is provided for this purpose so that the metallic strips 14 could occupy a maximum of four-fifths of the circumference of the cylinder 12. It should be appreciated that the portion of the circumference of a cylinder 12 required for balancing and the portion of the circumference occupied by the metallic strips 14 depends on the particular application and relative sizes of the web 10 and diameter of the cylinder 12.

As discussed above, the impedance measuring system of the present invention measures the impedance of a web of material to a radio frequency voltage applied between two metallic strips. In particular, the impedance between the metallic strips is a combination of the resistance of the web material between the strips and the capacitive reactance between the strips which is a function of the dielectric constant of the web material. Both the resistance and reactance are dependent on the moisture content of the paper. Therefore, the metallic strips 14 can be generally described as a capacitive electrode 40 as shown in FIG. 2.

In order to accurately measure impedance changes across the capacitive electrode 40, the measuring signal generator 20 has a bridge-type circuit which is sensitive to phase changes in a signal supplied by an oscillator 42 due to impedance changes across the capacitive electrode. An output signal from the oscillator 42 is fed through a line 44 to a bridge 46 and to a phase sensitive detector 48. The capacitive electrode 40 is connected through a line 50 to one branch of the bridge 46 and a voltage controlled capacitance 52 is connected by a line 54 to another branch of the bridge. The voltage controlled capacitance 52 is automatically adjusted, as described below, to balance the measuring signal generator 20. The output signal of the bridge 46 is connected to the phase sensitive detector 48 over a line 56 and is dependent on the difference between the impedance of the web 10 across the capacitive electrode 40 and a reference impedance. The reference impedance is preferably air and is provided when the web 10 is not in contact with the metallic strips. When the reference impedance is across the capacitive electrode 40, the d.c. output level of the phase sensitive detector 48 is determined by a reference voltage provided by a reference voltage generator 58 which is fed to the phase sensitive detector 48 over a line 60. The difference between the reference voltage 58 and the output of phase sensitive detector 48 is determined by means of signal amplifier 62. The output of the phase sensitive detector 48 is fed to a polarity inverting input of the amplifier 62 through a line 64 and the reference voltage is fed to the non-inverting input of the amplifier through line 60.

The output of the signal amplifier 62 is then representative of the impedance difference between free air and the web across the capacitive electrode 40 and is fed through a line 66 to a vertical amplifier 68 which in turn is connected to the vertical plates of a cathode ray tube 70 through a line 72.

As was discussed above with reference to FIG. 1, the sweep generator 28 generates a horizontal sweep voltage connected to the cathode ray tube (CRT) display 26 over the line 29. The sweep generator 28 shown in FIG. 2, includes a ramp voltage generator 74 with its output connected to a horizontal amplifier 76 through a line 78. The output of the horizontal amplifier 76 is in turn connected to the horizontal plates of the cathode ray tube 70 over a line 80. As was discussed above, the sweep rate of the sweep generator 28 is automatically synchronized with the rotation of the cylinder 12. This is accomplished by one output of an isolated simultaneous double trigger generator 82 which develops two simultaneous trigger pulses for each revolution of the cylinder 12. One pulse is connected through a line 84 to a pulse rate to voltage converter 86 in the sweep generator 28 which develops a voltage proportional to the rotation rate of the cylinder 12. The output voltage of the pulse rate to voltage converter 86 is connected to the ramp voltage generator 74 over a line 88 and controls the slope of the generated ramp. The trigger pulse is also connected to a reset unit 90 which generates a reset signal which is connected over a line 92 to the ramp voltage generator 74 to reset the voltage ramp to an initial condition after each sweep.

As was discussed above, the measuring signal generator 20 is balanced once for each revolution of the cylinder 12. The balance of the measuring signal generator 20 is determined by the output voltage of the signal amplifier 62 and the capacitive electrode 40 sensing the reference impedance which is free air. The output of the amplifier 62 appearing on line 66 is preferably equal to the reference voltage for the reference impedance and is periodically applied to an input line 94 of a sample and hold circuit 96 through a gate 98. The voltage on line 94 is compared with the reference voltage and the difference is held as a control voltage which is connected through a line 100 to a variable voltage generator 102. The voltage generated by the variable voltage generator 102 is connected over a line 104 to the voltage controlled capacitance 52 in a branch of the bridge 46.

The gate 98 is controlled by a balancing pulse generator 106 which develops an appropriately shaped and timed balancing pulse which is connected to the gate 98 through a line 108. The balancing pulse generator 106 is triggered by the second trigger pulse connected through a line 110 from the isolated simultaneous double trigger generator 82.

It should be noted that the balancing circuitry described is of the additive type in that the measuring signal generator 20 is driven toward the balance condition a small amount for each revolution of the cylinder 12 until the balance point is reached, at which time the drift of the electronic circuitry is small enough so that the measuring signal generator 20 remains substantially balanced for all further measurements.

The cathode ray tube display 26, sweep generator 28, the vertical and horizontal amplifiers 68, 76, respectively, and the cathode ray tube 70 of FIGS. 1 and 2 are of conventional design. The measuring signal generator 20 of FIGS. 1 and 2 may also be constructed utilizing conventional design techniques and may take the form shown in the schematic diagram of FIG. 3 which excludes the oscillator 42 and the balancing pulse generator 106 which are of conventional design.

Component values for the electrical schematic diagram shown in FIG. 3 are as follows:

$R_1, R_2, R_5 - R_7, R_{16}, R_{17} = 1K$
$R_3, R_4, R_8 - R_{11} = 2K$
$R_{12}, R_{15} = 100K$
$R_{13}, R_{14}, R_{19} = 100$ ohm
$R_{17} = 200K$
$C_1, C_6, C_7, C_9 = 0.025$ mfd.
$C_2 = 7 - 45$ pfd.
$C_3 = $ Variable 27 pfd.
$C_4 = $ Variable 150 pfd.
$C_5, C_8, C_{13} - C_{18} = 0.1$ mfd.
$C_{10} = 0.002$ mfd.
$C_4, C_{12}, C_{19} = 10$ mfd/35v
$C_{14} = 110$ mfd.
$C_{15} = 0.05$ mfd.
$C_{20} = 510$ pfd
$D_1 - D_4 = 1N914A$
$D_5 = 1N5147$
$L_1, L_2 = 2.5$ mh.
$Q_1 = 2N4342$
$IC_1 = UA740C$ (Fairchild)
$IC_2 = UA741C$ (Fairchild)
$T_1 = $ Toroidal wound on Ferrite core with 30 turns per winding.

Thus, the impedance measuring system of the present invention provides a means for scanning the impedance across a web of material which utilizes only a single sensing element in the form of a pair of metallic strips 14 spirally mounted on the external surface of a cylinder 12 so that only a small portion of the strips contact a web 10 to be measured during a given instant of time. After initial adjustments are made, the scanning system automatically adjusts to varying speeds of the web 10. The balancing and sweeping circuitry of the system is automatically controlled by a trigger pulse generating configuration which generates a pair of simultaneous, isolated trigger pulses to eliminate the need for complicated electrical coupling arrangements between the rotating cylinder 12 and a remote display unit.

While a particular presently preferred embodiment of impedance scanning and monitoring system has been described in detail herein, it will be appreciated that many forms of electronic control and display circuitry are possible. Thus, the invention is not to be limited except by the following claims.

I claim:

1. A system for measuring impedance as a function of position across a web of material, said system comprising:
    a cylinder having its longitudinal axis across said web, said cylinder having minimal surface contact with said web;

a sensing element having a pair of relatively narrow parallel strips spaced a relatively short distance apart and spirally positioned around the external surface of said cylinder, whereby said sensing element may make contact with said web over a minimal section of the width of said web, said section moving over the width of said web as said cylinder rotates;

means for generating an alternating voltage between said spaced parallel strips, said section of said web being in contact with said strips forming an impedance between said strips; and means for measuring said impedance to produce an impedance signal.

2. The system defined in claim 1 wherein said means for measuring includes a bridge having said strips in a first branch and a variable capacitance in a second branch, said variable capacitance being controlled to balance said bridge.

3. The system defined in claim 2 wherein said strips are spirally positioned around said cylinder for a circumferential distance less than the total circumference of said cylinder, said variable capacitance is controlled to balance said bridge when said web is in contact with the portion of said cylinder which does not carry said strips.

4. The system defined in claim 1 including means for displaying said impedance signal as a function of the position of said section across the width of said web.

5. The system defined in claim 4 including triggering means for generating two simultaneous, electrically isolated trigger pulses for each revolution of said cylinder, said means for displaying being synchronized with the rotation of said cylinder by a first one of said trigger pulses.

6. The system defined in claim 5 wherein said trigger pulses are generated when said web is in contact with a portion of the circumference of said cylinder which does not carry said strips.

7. A system defined in claim 5 including balancing means for balancing said measuring means, the operation of said balancing means being initiated by a second one of said trigger pulses.

8. A system for measuring impedance as a function of position across a web of material, said system comprising:

a cylinder having its longitudinal axis across said web, said cylinder having minimal surface contact with said web;

a sensing element having a pair of spaced parallel strips spirally positioned around the external surface of said cylinder, whereby said sensing element may make contact with said web over a minimal section of the width of said web, said section moving over the width of said web as said cylinder rotates;

means for generating an alternating voltage between said spaced parallel strips, said section of said web being in contact with said strips forming an impedance between said strips; and means for measuring said impedance to produce an impedance signal;

triggering means for generating two simultaneous, electrically isolated trigger pulses for each revolution of said cylinder, said means for displaying being synchronized with the rotation of said cylinder by a first one of said trigger pulses;

balancing means for controlling said variable capacitance to balance the said bridge, the operation of said balancing means being initiated by a first one of said trigger pulses; and wherein said means displaying is synchronized with the rotation of said cylinder by a second one of said trigger pulses.

9. A system for measuring impedance as a function of position across a web of material, said system comprising:

a cylinder having its longitudinal axis across said web, said cylinder having minimal surface contact with said web;

a sensing element having a pair of spaced parallel strips spirally positioned around the external surface of said cylinder, whereby said sensing element may make contact with said web over a minimal section of the width of said web, said section moving over the width of said web as said cylinder rotates;

means for generating an alternating voltage between said spaced parallel strips, said section of said web being in contact with said strips forming an impedance between said strips;

means for measuring said impedance to produce an impedance signal;

triggering means for generating two simultaneous electrically isolated trigger pulses for each revolution of said cylinder;

display means for visually displaying said impedance signal as a function of the position of said section across the width of said web, said impedance signal being applied to a vertical control section of said display means, said display means having a horizontal coordinate generator for moving a horizontal coordinate position in accordance with the rotational position of said cylinder, said horizontal coordinator generator being synchronized with a rotation of said cylinder by a first one of said trigger pulses; and balancing means for balancing said measuring means prior to measuring said impedance, said balancing means being synchronized with the rotation of said cylinder by a second one of said trigger pulses.

10. A system for measuring impedance as a function of position across a web of material, said system comprising:

a cylinder having its longitudinal axis across said web, said cylinder having minimal surface contact with said web;

a sensing element having a pair of spaced parallel strips spirally positioned around the external surface of said cylinder for a circumferential distance of approximately four-fifths of the total circumference of said cylinder, whereby said sensing element may make contact with said web over a minimal section of the width of said web, said section moving over the width of said web as said cylinder rotates;

means for generating an alternating voltage between said spaced parallel strips, said section of said web being in contact with said strips and forming an impedance between said strips; and means for measuring said impedance to produce an impedance signal.

* * * * *